Patented Nov. 8, 1949

2,487,298

UNITED STATES PATENT OFFICE 2,487,298

SEPARATION OF NITRILES

Richard B. Bishop, Haddonfield, and William I. Denton, Woodbury, N. J., assignors to Socony-Vacuum Oil Company, Incorporated, a corporation of New York No Drawing. Application June 26, 1947, Serial No. 757,316

3 Claims. (Cl. 260—465)

This invention relates to a process of separating aromatic nitriles from mixtures that contain them, and particularly from mixtures that also contain hydrocarbons and may contain both mono- and polynitriles. Such mixtures are formed by the treatment of mixed hydrocarbons with ammonia in the presence of a catalyst, at elevated temperatures.

The following prior filed patent applications disclose methods of preparing nitriles by reacting hydrocarbons with ammonia, in gaseous phase, at elevated temperatures, in the presence of a catalytic material containing a metal oxide selected from the group consisting of molybdenum and tungsten oxide. Caldwell and Chapman, Serial No. 641,640, filed January 16, 1946, now Patent No. 2,450,632 Caldwell and Chapman, Serial No. 643,742, filed January 26, 1946, now abandoned and Denton and Bishop, Serial No. 645,012, filed February 1, 1946, now Patent No. 2,450,637.

In accordance with the practices described in the above applications, there result mixtures of mononitriles with hydrocarbons, and in some cases polynitriles are also present.

In following the practices described in the above applications, it is often advantageous to start with a mixture of hydrocarbons such, for example, as "Sovasol-74." "Sovasol-74" is a mixture of hydrocarbons about 60% to 70% of which are aromatic. The remainder are chiefly naphthenes. "Sovasol-74" is a tradename of the Socony-Vacuum Oil Company, Incorporated for an aromatic solvent obtained from catalytic cracking operations, having a boiling range of 280–370° F., a specific gravity of about 0.8443 and a mixed aniline point of 79. The advantage of using such a material as "Sovasol-74" instead of a pure aromatic hydrocarbon is that it is cheaper and the nature of the process, as described in the above applications, is such that the naphthenes are converted to aromatic hydrocarbons, thus, in effect, providing a charge which is essentially all aromatic, at a cost equivalent to that of a mixed charge.

There are several disadvantages to the use of a mixed charge: (1) Mixed nitriles are formed which must be separated; (2) the higher-boiling hydrocarbons in the charge boil at temperatures very close to that at which benzonitrile boils; and (3) under some conditions of reaction hydrocarbon polymers are formed which boil in the same range as aromatic nitriles. The boiling point of benzonitrile is 372° F.

Because of the similarity of boiling points of the compounds involved, distillation does not offer a satisfactory means of separation. It has now been discovered that by the use of an alcohol-water mixture, within the proper range of proportions, the nitriles can be separated from the hydrocarbons, and also from the polynitriles, by solvent extraction. For example, a mixture of aromatic mononitriles and aromatic hydrocarbons has been found to be completely soluble in absolute ethyl alcohol. However, when sufficient water is added to give an ethyl alcohol-water mixture containing about 80–85% alcohol and 15–20% water, by volume, the hydrocarbons become insoluble but the mononitriles do not. If additional water is added until the alcohol-water contains about 60–65% alcohol to 35–40% water, the mononitriles also become insoluble. Thus, it is apparent that by the use of ethyl alcohol-water mixture containing 85% alcohol, for example, the mononitriles may be dissolved and thus separated from the hydrocarbons. Since polynitriles are insoluble in alcohol-water mixtures containing more than 5% water, by using an 85 to 15% alcohol-water mixture they may be separated from the mononitriles with the hydrocarbon and recovered in a subsequent step.

By the use of a continuous multi-phase extractor, a very thorough separation can be effected with an ethyl alcohol-water mixture containing as little water as 5% or as much water as 40%, by volume. The most desirable proportion to use will depend on the particular nitrile-hydrocarbon mixture to be separated.

Although ethyl alcohol is preferred for the practice of the process of this invention, other alcohols, such as methanol and isopropyl alcohol, may be used with highly satisfactory results, and still other solvents such as acetone, acetic acid and the like are within the somewhat broader scope of this invention.

Since the solubility of the various components of the mixture to be separated vary with different solvents, the desirable proportion of water to solvent may be expected to be different with different solvents. Likewise, the use of different nitriles and different hydrocarbons will require some modification of the solvent. However, the proportion of water to solvent in each case can easily be selected so as to provide a water-solvent mixture having the desired selective solvent effect.

Further understanding of the details and advantages of this invention may be gained by a consideration of the following specific examples.

*Example I*

A hydrocarbon-nitrile residue obtained by the removal of as much unreacted hydrocarbon as expedient, by distillation, from the products of a reaction of "Sovasol-74" with ammonia in accordance with application Serial No. 641,640, above, was extracted in two stages, with an 85 to 15 ethyl alcohol-water solvent, using a volume of solvent equal to that of the reaction products, in each stage. The resulting extracts and raffinates, after removal of solvent, were tested for per cent nitrogen, refractive index and density.

|  | Per Cent Nitrogen | Refractive Index | Density |
|---|---|---|---|
| Product before extraction | 2.13 | 1.483 | 0.8602 |
| Extract A | 7.11 | 1.5142 | 0.9328 |
| Extract B | 5.01 | 1.5010 | 0.9088 |
| Raffinate | 0.71 | 1.4740 | 0.8418 |

The increase in nitrogen content, refractive index and density in the extracts clearly indicates a concentration of the nitriles therein. It is apparent from the above data that a continuous multi-stage extraction would accomplish a very complete separation of the nitriles from the hydrocarbons.

*Example II*

Synthetic mixtures of hydrocarbons and paratolunitrile were prepared and subjected to similar extraction with methanol-water mixtures. The hydrocarbons were a mixture of 44% alkyl benzenes, 43% methyl and dimethyl naphthalenes, and small amounts of a mixture of paraffins and naphthenes, having a boiling range of 392-516° F., an API gravity of 24.4, and a flash point of 175° F. The percentage of nitrogen, and hence the percentage of nitriles in each of the two extracts showed a considerable increase over the percentage of nitrogen and hence the percentage of nitriles in the original material. In one test, the mixture used consisted of 80% of methanol and 20% of water, by volume, and in a second test the solvent consisted of 90% methanol and 10% of water, by volume. The results were as follows:

| Per Cent $CH_3OH$ | Original Mixture Per cent Nitrogen | Extract #1 Per Cent Nitrogen | Extract #2 Per Cent Nitrogen |
|---|---|---|---|
| 80 | 6.6 | 10.9 | 7.38 |
| 90 | 6.5 | 9.0 |  |

Tests indicate that polynitriles, like hydrocarbons, become insoluble as water is added to the solvent, and before enough water is added to make the mononitriles also insoluble. However, the proportion of water may be adjusted first to a point where the polynitriles are relatively insoluble and the hydrocarbons, as well as the mononitriles, are relatively soluble. When methyl alcohol is used as the extractant, no water is required to make the methyl alcohol selectively dissolve the hydrocarbons and mononitriles and leave the polynitriles undissolved. When ethyl alcohol is used as the extractant, and from 0 to 5% of water is added, the polynitriles remain insoluble and the hydrocarbons and mononitriles are soluble. As the concentration of ethyl alcohol is reduced until it approaches 85% the hydrocarbons begin to become insoluble and the effectiveness of the separation of polynitriles from hydrocarbons becomes poorer, but the separation of hydrocarbons from mononitriles begins to be effective. With higher alcohols, the same general phenomena is observable, but the specific proportions of water differ. By the use of a proportion of water just sufficient to make the polynitriles relatively insoluble and both the mononitriles and hydrocarbons soluble, both the mononitriles and hydrocarbons may be separated from the polynitriles, by either a single stage or multi-stage extraction.

By further increasing the water content of the solvent mixture, the mononitriles may be separated from the hydrocarbons, after performing the separation described in the paragraph just preceding, or the mononitriles may be separated from both the hydrocarbons and the polynitriles, as described earlier in the specification, and the polynitriles later separated from the hydrocarbons by adjusting the proportions of water and solvent so that the mixture will effect the separation.

In accordance with this invention, any solvent may be used which will, when undiluted with water, dissolve hydrocarbons and nitriles, and which is also miscible with water. It has been found that any such solvent, when mixed with water, progressively loses its ability to dissolve, first polynitriles, then hydrocarbons, and then mononitriles. With this knowledge it is relatively simple to proportion the solvent and water so as to obtain a mixture that will selectively dissolve and thereby separate the mononitriles from the hydrocarbons and polynitriles, the mononitriles and hydrocarbons from the polynitriles, the polynitriles from the hydrocarbons, if no mononitriles are present, or the mononitriles from the hydrocarbons if no polynitriles are present.

The extraction operation may be accomplished in any well known manner, either in a single stage batch process, a continuous single stage process, a continuous multi-stage process or in a tower-type extraction process. Many methods and many types of equipment are already available in the prior art for this purpose, and will not be described here.

Temperature will obviously have an effect upon the dissolving power of the solvent mixture and hence it is within the scope of this invention to use any desired temperature either above or below room temperature and to adjust the proportions of solvent and water so that they will have the desired selectiveness at the temperature used. The examples given above were conducted at room temperature.

What is claimed is:

1. A method of separating aromatic mononitriles from a mixture containing aromatic mononitriles, aromatic polynitriles and aromatic hydrocarbons, that comprises extracting the mixture with a solvent mixture containing water and an alcohol, said solvent mixture containing a proportion of water to alcohol such that the solvent mixture will selectively dissolve the hydrocarbons and mononitriles in preference to the polynitriles, and thereafter extracting the resultant mixture of hydrocarbons and mononitriles with a solvent mixture containing water and an alcohol, said solvent mixture containing a larger proportion of water to alcohol such that the mixture will selectively dissolve the mononitriles in preference to the hydrocarbons.

2. A method of separating aromatic mononitriles from a mixture containing aromatic mononitriles, aromatic polynitriles and aromatic hydrocarbons, that comprises extracting the mixture with a solvent mixture containing water and ethyl alcohol, said solvent mixture containing a proportion of water to ethyl alcohol such that the solvent mixture will selectively dissolve the hydrocarbons and mononitriles in preference to the polynitriles, and thereafter extracting the resultant mixture of hydrocarbons and mononitriles with a solvent mixture containing water and ethyl alcohol, said solvent mixture containing a larger proportion of water to ethyl alcohol such that the mixture will selectively dissolve the mononitriles in preference to the hydrocarbons.

3. A method of separating aromatic mononitriles from a mixture containing aromatic mononitriles, aromatic polynitriles and aromatic hydrocarbons, that comprises extracting the mixture with a solvent mixture containing water and ethyl alcohol, said solvent mixture containing a proportion of water to ethyl alcohol such that the solvent mixture will selectively dissolve the hydrocarbons and mononitriles in preference to the polynitriles, and thereafter extracting the resultant mixture of hydrocarbons and mononitriles with a solvent mixture containing ethyl alcohol and at least 15% and less than 40% of water.

RICHARD B. BISHOP.
WILLIAM I. DENTON.

REFERENCES CITED

The following references are of record in the file of this patent:

UNITED STATES PATENTS

| Number | Name | Date |
| --- | --- | --- |
| 2,133,007 | Ralston et al. | Oct. 11, 1938 |

OTHER REFERENCES

MacArdle, "Solvents in Synthetic Organic Chemistry," (Van Nostrand), pp. 47–50 (1925).